E. W. MILHADO.
VEGETABLE SCRAPER OR PEELER.
APPLICATION FILED SEPT. 27, 1910.
990,449.
Patented Apr. 25, 1911.
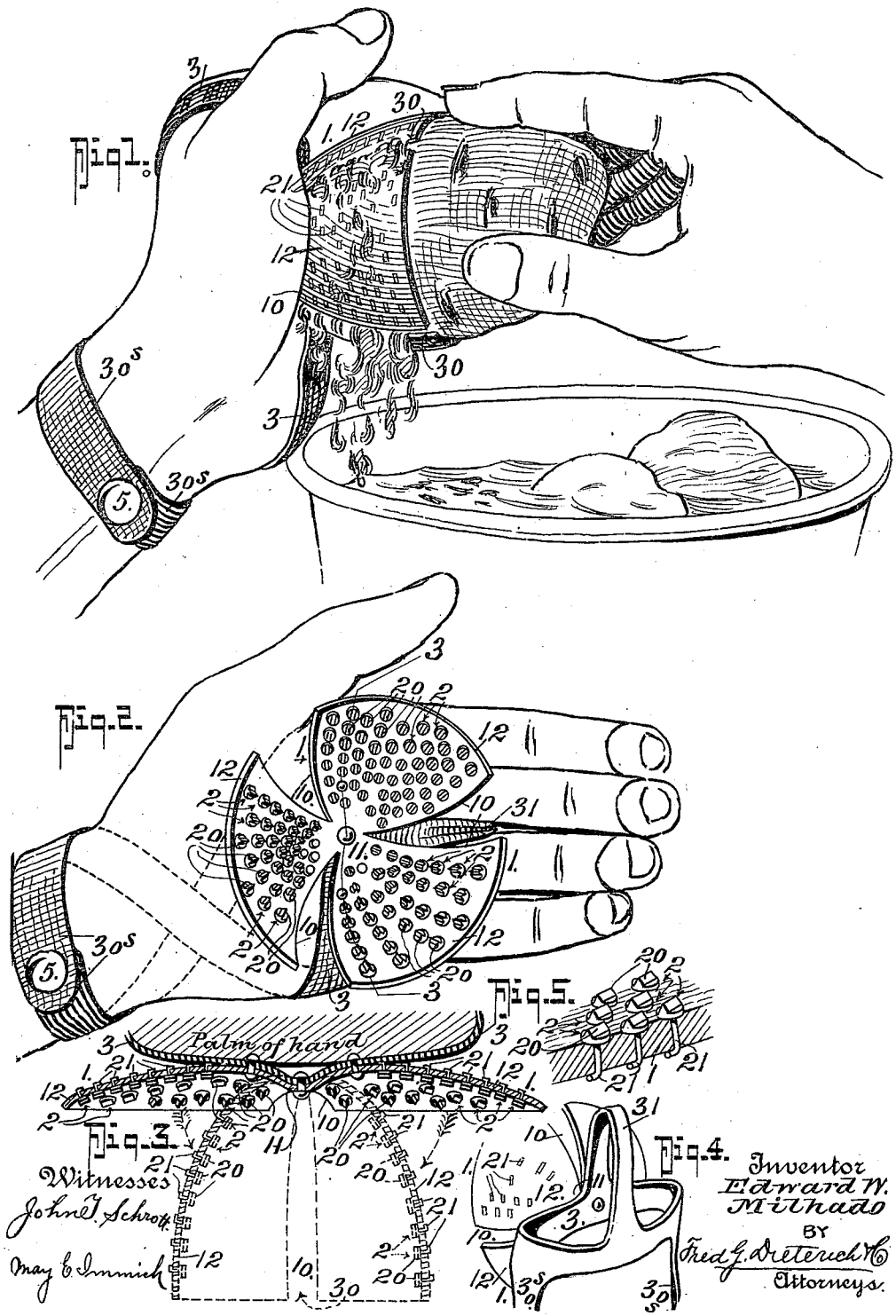

UNITED STATES PATENT OFFICE.

EDWARD W. MILHADO, OF MINERAL, VIRGINIA.

VEGETABLE SCRAPER OR PEELER.

990,449.

Specification of Letters Patent. Patented Apr. 25, 1911.

Application filed September 27, 1910. Serial No. 584,000.

*To all whom it may concern:*

Be it known that I, EDWARD W. MILHADO, residing at Mineral, in the county of Louisa and State of Virginia, have invented a new and Improved Vegetable Scraper or Peeler, of which the following is a specification.

This invention relates to improvements in vegetable peelers or scrapers and more particularly has reference to that type of devices generally disclosed in my patent No. 902428, dated October 27, 1908, and it primarily has for its object to provide a device of the general character referred to, of a simple and inexpensive nature that can be readily applied to and held on one hand of the operator, as the vegetable is held by the other hand and engaged by the said device.

In its generic nature, my invention is a scraper or peeler body formed to seat on the palm of the hand and to assume a cup-like shape as the hand is closed for fitting over the article to be peeled or scraped.

In its more complete nature, my invention embodies a yieldable body adapted to fit on the palm of the hand and shaped to close upon the article to be engaged thereby, and a mit-like member for holding the said body firmly on the hand of the user.

In its more subordinate nature, my present invention consists in certain details of construction, and combination of parts hereinafter explained, pointed out in the claim, and illustrated in the accompanying drawing, in which:—

Figure 1, is a perspective view that illustrates the manner in which my invention is used. Fig. 2, is an inverted plan view and shows the scraper body to its expanded or normal position. Fig. 3, is a transverse section of the device, taken substantially on the line 3—3 on Fig. 2, the closed in position of the scraper or peeling body being indicated by dotted lines. Fig. 4, is a detail view of a portion of the scraper body and the mit-like holder. Fig. 5, illustrates the manner in which the scraper or peeler members are secured to the scraper body.

In the practical arrangement, my present invention comprises essentially but two parts, a scraper or peeler body and means for quickly and securely holding the same in the palm of the hand. The scraper body 1 is formed of any suitable flexible or bendable material, preferably of that kind that expands when free of compression.

In the showing made, the body 1 when at its expanded or normal position is substantially disk shaped and it is formed of stout leather. The disk-like body has V-shaped portions 10—10 whereby to form the body of a central solid portion 11 and a plurality of like shaped sections 12—12, the cut out portions 10 being so made that when the sections are closed in they form a cup-like member for receiving the article to be treated, potatoes for example. Each body section has a series of scraper or peeling projections 2 preferably of metal and secured to the body in any approved manner. I prefer to make the scraper or peeler members in the nature of headed pins and the heads 20 tapered or sharpened as best shown in Fig. 5. By forming the members 2, as shown and described, the pin portions 21 can be readily pushed through the body 1 and upset or clenched as shown.

In cutting the several sections that form the disk-like body 1, the V-shaped openings are relatively such, with respect to the sections, that in closing the sections to form the scraper cup, see Fig. 1, the edges of the sections do not quite meet, and thereby leave slits 30 of gradually increasing width from the center to the circumferential edges, for the escape of the peelings as they are scraped off the vegetable, it being understood that after being used, the scraper body can be thoroughly cleared of scrapings or peelings by rinsing the same in water.

For conveniently and positively holding the scraper body on the hand, the same is riveted or otherwise secured to a mit-like harness that consists of a strap body 3 for encircling the ball portion of the hand, a pair of extended straps $30^s$ for passing over the hand and the wrist, see Fig. 2, the ends of which have fastening means, preferably a glove snap button 5 and a loop like portion 31 for passing between the fingers, see Fig. 2, that serves to firmly brace the harness on the finger end of the hand as the straps $30^s$ secure the same on the wrist. The loop 31 also acts as a hanger for the device when not in use.

From the foregoing, taken in connection with the drawings, the advantages and the manner in which my device is used will be readily apparent.

It will be noticed the scraper device can be readily harnessed to either hand, and as the potato or other article is held in the other hand, the scraper sections can be quickly closed over the same by simply closing the hand that holds the scraper over the end of the potato, the flexible or semi-elastic condition of the several disk sections being such that the said sections readily adapt themselves to the contour of the potato. A twisting movement of the now cup-like body 1 or of the potato causes the scrapers to peel or scrape the potato, the peelings passing through the slits in the cup-like body.

While I have described the cup-like body 1 as preferably of leather, the same may be of metal, rubber or any other material whose sections will spread as the hand is opened, and while the harness shown and described for securing the device on the hand is also a preferred means of attachment, it is obvious that the said means may be modified or varied without departing from the scope of the appended claim.

What I claim is:—

A device of the character stated, comprising a radially slitted disk like body of a yieldable material and carrying upon one face a plurality of scraping members and a harness for securing the body on the hand.

EDWARD W. MILHADO.

Witnesses:
R. F. BURNHAM,
W. F. DILLARD.

---

Copies of this patent may be obtained for five cents each, by addressing the "Commissioner of Patents, Washington, D. C."